S. PEACOCK.
PROCESS OF MAKING PENTOXID OF PHOSPHORUS AND CALCIUM SILICATE.
APPLICATION FILED SEPT. 2, 1909.
997,086.
Patented July 4, 1911.
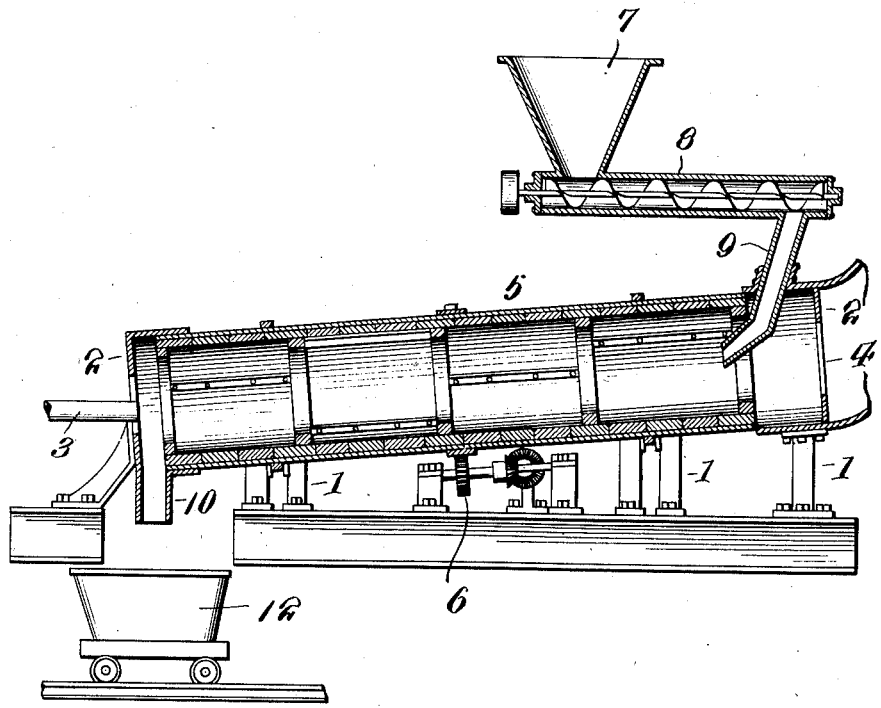

UNITED STATES PATENT OFFICE.

SAMUEL PEACOCK, OF CHICAGO, ILLINOIS, ASSIGNOR TO AMERICAN CYANAMID COMPANY, OF NEW YORK, N. Y., A CORPORATION OF MAINE.

PROCESS OF MAKING PENTOXID OF PHOSPHORUS AND CALCIUM SILICATE.

997,086.  Specification of Letters Patent.  Patented July 4, 1911.

Application filed September 2, 1909.  Serial No. 515,803.

*To all whom it may concern:*

Be it known that I, SAMUEL PEACOCK, a citizen of the United States, residing at Chicago, in the county of Cook and State of Illinois, have invented certain new and useful Improvements in Processes of Making Pentoxid of Phosphorus from Phosphates; and I do hereby declare the following to be a full, clear, and exact description of the invention, such as will enable others skilled in the art to which it appertains to make and use the same.

This invention relates to a process of making the pentoxid of phosphorus ($P_2O_5$) from phosphate rock, or other suitable source of cheap phosphate of lime and silica, or phosphate rock and crude silicate of alumina, in a simple and comparatively inexpensive manner.

To this end, the invention consists in the novel steps and combinations of steps constituting my process, more fully hereinafter disclosed, and particularly pointed out in the claims.

Referring to the accompanying drawings, forming a part of this specification, the figure is a sectional diagrammatic view of a well known type of furnace suitable for carrying out my invention.

1 represents any suitable supports, 2, stationary end closures provided with an inlet 3, for the fuel, and an exit 4, for the gases, 5 a rotating barrel part; 6 means for rotating the same; 7 a hopper for receiving the rock mixture; 8 a screw conveyer for the same; and 9 a delivery spout leading into the furnace.

10 represents a suitable delivery passage for the calcium compounds; and 12 a suitable receptacle for receiving the same.

In carrying out my invention I proportion the mixtures of phosphate of lime and silica, or silicious clays, etc., in accordance with the following reactions:—

$3Al_2O_3.3SiO_2 + 6CaO.2P_2O_5 =$
$\qquad 3Al_2CaO_4.3SiCaO_3 + 2P_2O_5.$
$3SiO_2 + Ca_3(PO_4)_2 = P_2O_5 + 3CaSiO_3$
$3Al_2O_3 + Ca_3(PO_4)_2 = P_2O_5 + 3CaAl_2O_4$
$3Fe_2O_3 + Ca_3(PO_4)_2 = P_2O_5 + 3CaFe_2O_4.$ It must be understood, however, that one or more of the basic lime compounds of silica, or of silica, ferric oxid and alumina, may be formed either wholly or in part from the constituents described by rearranging the proportions. As more or less alumina is commonly found associated with silica, the same must be allowed for as an acid in proportioning the materials of the furnace mixture, in general accordance with the reactions detailed hereinbefore.

The mixture of phosphate of lime and silica being proportioned in compliance with the general reaction requirements, the whole is finely pulverized, thoroughly mixed together and passed through and heated in a suitable furnace, preferably of the type of that shown herewith, to about 1400 degrees centigrade, during which treatment the reactions heretofore described take place, the phosphorus pentoxid is expelled by volatilization, and is either absorbed in water, condensed, or used as an acid upon fresh quantities of phosphate rock, as occasion may justify or require.

The usefulness of this invention depends upon the production of phosphorus pentoxid free from sulfuric acid, arsenic, antimony, or lower oxids or phosphorus more or less poisonous or unsuitable for use in plant foods and compounds to be used in the preparation of plant foods.

I am aware that it has been heretofore proposed to produce phosphorus pentoxid by treating at high temperatures mixtures of lime phosphate, silica, and carbon, but pure phosphorus pentoxid cannot be thus produced, on account of the formation, by the action of the carbon present, of more or less of the phosphids of calcium as well as of the lower oxids of phosphorus.

I am also aware that it has been proposed to separate the phosphoric anhydrid by a distilling operation in a vessel containing silicious material, but I have demonstrated by actual tests that no commercial quantities of phosphoric anhydrid can be obtained in this manner, and for the reason that in order to get the temperature sufficiently high in such cases to drive off $P_2O_5$, the mass must be molten, and when it is in this condition, it constitutes a viscous or plastic mass through which the gas cannot freely escape, and further, if the process is to be conducted on a commercial scale, the hydrostatic pressure in the charge will be so great that the equilibrium of the reaction reverses and no $P_2O_5$ is displaced. On the other hand, if the phosphatic and silicious material in its molten condition is caused to form a thin film on the interior of a rotating furnace and is thereupon subjected to a diminished pressure as the furnace rotates, as is the case in my process above, actual demonstrations show that $P_2O_5$ comes off without difficulty. In my process, therefore, I cause the production of phosphorus pentoxid, by displacement from its lime combinations in a neutral or oxidizing furnace atmosphere, and by means of silicia, and, therefore, produce said pentoxid free from the lower oxids of phosphorus.

The by products are useful in making pozzuolana cement, which is a cement containing a much higher percentage of silicia than Portland cement and requires in its making a base material having a substantially uniform content of lime, silica and alumina. The slag produced by my process is composed of definite chemical compounds and is therefore uniform in its composition.

The process of making calcium aluminate by heating phosphate rock and materials containing alumina, as described herein is claimed in my co-pending application No. 502,973, and the process of making calcium ferrite as by heating phosphate rock and iron oxid as shown herein is claimed in my Patent #988,137.

What I claim is:

1. The process for producing phosphorus pentoxid substantially free from the lower phosphorus oxids and from lime phosphate, which consists in mixing said phosphates with silica in such proportions that chemically equivalent quantities of calcium oxid will be supplied to the silica present in the mixture; and in heating said mixture in a suitable atmosphere to a temperature sufficient to free said pentoxid from the lime phosphate and in segregating said heated mixture in thin layers to permit the said pentoxid to escape, substantially as described.

2. The process of producing phosphorus pentoxid free from the lower oxids of phosphorus, and from lime phosphate, which consists in mixing said phosphate with crude silica in such proportions that sufficient calcium oxid will be present in the mixture to chemically react with substantially all the silica, and alumina, and iron oxid, that may also be present in the crude silica; and in heating the mixture to a temperature sufficient to free said phosphorus pentoxid from said phosphate and in segregating said heated mixture in thin layers to permit the said pentoxid to escape, substantially as described.

3. The process of producing phosphorus pentoxid free from the lower oxids of phosphorus and from lime phosphate, which consists in mixing said phosphate with silica, with iron oxid, and with alumina in such proportions that sufficient calcium oxid will be present in the mixture to chemically react with substantially all of the silica, iron oxid and alumina; in heating said mixture in a non-reducing atmosphere to a temperature sufficient to free said pentoxid from said phosphate; and in suitably recovering said pentoxid; substantially as described.

In testimony whereof, I affix my signature, in presence of two witnesses.

SAMUEL PEACOCK.

Witnesses:
T. A. WITHERSPOON,
GEO. B. PITTS.